Figure 1:
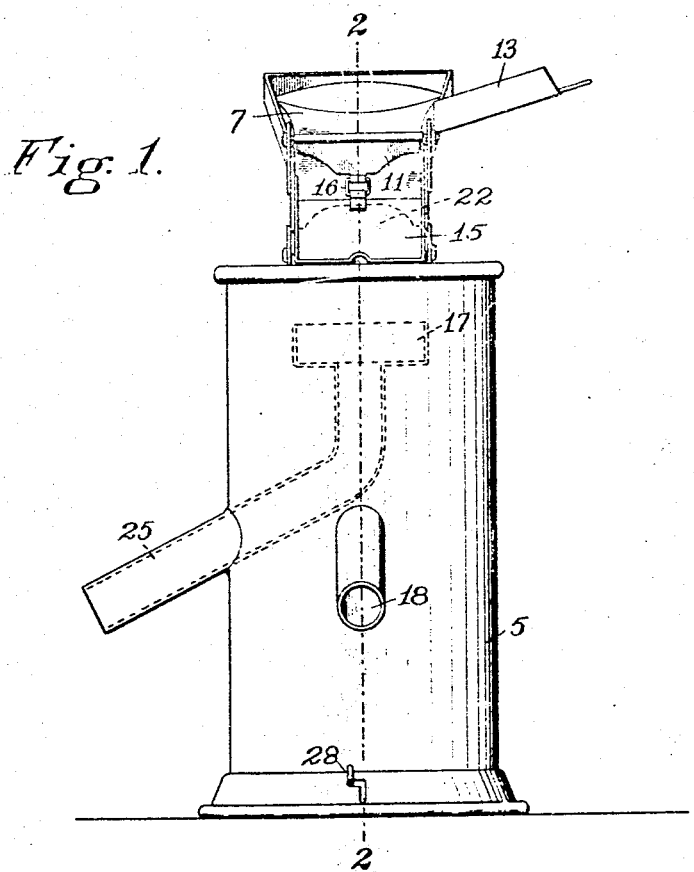

M. BURRMEISTER.
EGG SEPARATOR.
APPLICATION FILED JAN. 6, 1910.

956,678.

Patented May 3, 1910.
2 SHEETS—SHEET 1.

Witnesses
R. D. Tolman
A. N. Neilson.

Inventor
Martin Burrmeister.
By Hartley W. Bartlett
Attorney

M. BURRMEISTER.
EGG SEPARATOR.
APPLICATION FILED JAN. 6, 1910.
956,678.
Patented May 3, 1910.
2 SHEETS—SHEET 2.
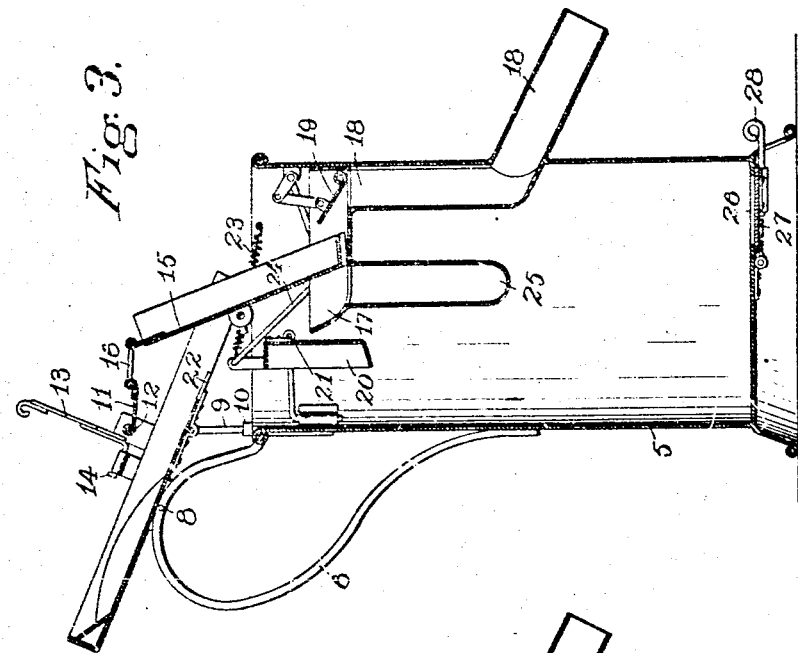
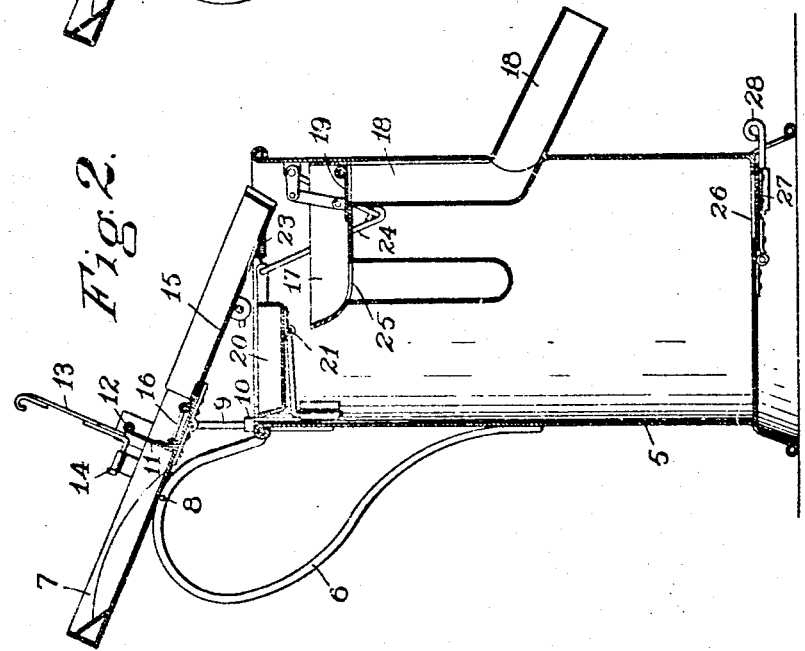
Witnesses
R. D. Tolman
A. H. Neilson
Inventor
Martin Burrmeister
By Hartley W. Bartlett
Attorney

UNITED STATES PATENT OFFICE.

MARTIN BURRMEISTER, OF WORCESTER, MASSACHUSETTS.

EGG-SEPARATOR.

956,678.     Specification of Letters Patent.     Patented May 3, 1910.

Application filed January 6, 1910. Serial No. 536,675.

*To all whom it may concern:*

Be it known that I, MARTIN BURRMEISTER, a subject of the Emperor of Germany, residing at Worcester, in the county of Worcester, State of Massachusetts, have invented a certain new and useful Improvement in Egg-Separators, of which the following is a specification, reference being had therein to the accompanying drawings.

This invention relates to kitchen articles, but more particularly to devices for separating eggs.

It is frequently necessary in cooking to separate the yolk and the white of eggs, and the methods heretofore used have required a considerable expenditure of time as well as skill to do this work.

The object of this invention is to provide a device which will mechanically and efficiently perform this operation without requiring any skill on the part of the operator.

The operation of this device depends on the fact that the yolk of an egg is in globular form while the white is free. A run way is provided in which there is a gate which obstructs the passage of the yolk until the white has run to the lower end of a rocking platform. As the weight of the white of the egg causes this platform to rock, the gate is raised by an attachment connecting the platform with the gate, and the yolk is allowed to slide downward and drop into a passage which has been uncovered by the rising of the upper end of the platform. In the passage into which the yolk drops is a spring controlled swinging vessel which receives and is swung down by the weight of the same. This vessel operates a gate in the vessel into which the white of the egg has emptied and allows the white to pass into a retainer.

The device is so constructed that a putrefied egg is separated from the fresh eggs. This depends on the fact that the yolk and the white in such an egg are mixed. When this egg is broken, the whole mass goes onto the rocking platform as does only the white in a fresh egg. The platform tips as before, allowing the mass to empty into the vessel which normally receives the white, but the gate in this vessel remains closed as no yolk drops into the other passage to open it, and the platform rocks back to its normal position. In doing so it uncovers another passage into which the mass flows.

A feature of the device is a cutter beside the gate which halts the yolk on the run way. This is used to separate the white from the yolk when necessary.

One embodiment of this invention is shown in the drawings in which:—

Figure 1 is a front elevation of the invention complete. Fig. 2, a section on the line 2—2 of Fig. 1. Parts in normal position. Fig. 3, same as Fig. 2. Parts in position of discharge.

In the drawings the device is shown to consist of a container 5 provided with a handle 6. To the top of this handle 6 is secured a run way 7 by means of the pin 8. This run way is detached from the container by withdrawing the pin 8 and raising the former to allow the bracing rods 9 to slide out of the sockets 10. Extending across this run way is a swinging gate 11 which is hinged on the pin 12. Beside this gate is a cutter 13 pivoted at 14, the object of which will be fully described hereinafter.

Near the bottom of the run way is pivoted the rocking platform 15, a portion of which rests upon the lower portion of the run way and fits the inner surface thereof. This platform like the run way, is provided with retaining walls for the purpose which will be shown hereinafter. Across the lower end of the platform extends another wall connecting the side retaining walls. The upper edge of the rocking platform 15 is connected to the gate 11 by a link 16.

Beneath the lower extremity of the platform 15 is a vessel 17 which is secured to the walls of the container 5. In the bottom of this vessel is a passage 18 which is covered by a gate 19. Near the opposite side of the container is pivoted the swinging vessel 20 by means of the pivot pin 21. This vessel is directly beneath the opening 22 in the run way which opening is normally covered by the upper portion of the rocking platform. This vessel 20 is controlled by the spring 23 to cause it to normally rest in a horizontal position. It is connected to the gate 19 by a link 24 in such a manner that the swinging downward of the vessel causes the gate to be raised and to uncover the passage 18. In the rear portion of the vessel 17 is another passage 25. When the platform 15 rocks downward, it forms a gate across the vessel and prevents any of the contents of the vessel from flowing into this passage. The contents of the container is emptied by a passage 26 in the bottom thereof, and this is normally closed by the pivoted gate 27 which is locked by the snap catch 28.

The operation of the device is as follows:—An egg is broken and the entire contents are emptied into the upper portion of the run way 7 and the mass flows down the same until it encounters the gate 11 where the yolk is halted because of its globular form, but the white, being free, passes under the gate onto the rocking platform 15 and down to the lower extremity of the same where it is halted by the cross wall. The weight of the white of the egg then causes the lower extremity of this platform to swing downward until it strikes the base of the vessel 17 and the contents is emptied therein. As the platform swings downward, the link 16 causes the gate 11 to swing upward, releasing the yolk of the egg and allowing it to slide downward and drop into the vessel 20, which by the weight thereof, is then swung down and the yolk allowed to drop to the bottom of the container 5. As the vessel 20 swings down, the link 21 causes the gate 19 to be raised and allows the white of the egg to flow into the passage 18. As soon as the yolk is emptied from the vessel 20, the spring 23 causes this vessel to return to its normal position and closes the gate 19. When a putrefied egg is emptied on the run way 7, the whole mass flows under the gate 11, as the yolk is not in globular form, and this mass is emptied into the vessel 17 as was the white of the egg in the above description. As soon as the mass has entirely emptied therein, the platform swings upward, uncovering passage 25. As no yolk has dropped into the vessel 20, the gate 19 has not been raised to release the mass into the passage 18, so that it flows into the passage 25.

In the separator shown in the drawings, the white is carried out by the passage 18 and emptied into a vessel which may be placed thereunder, the yolk is deposited in the bottom of the container, and the putrefied eggs are emptied by the passage 25 into another vessel which may be placed under the same to receive them.

It may readily be seen that a great number of other modifications of the device might be constructed without departing from the principle of the invention and the inventor does not limit himself to any particular embodiment of this principle.

What I claim as my invention and desire to secure by Letters Patent is:—

1. A device of the class described, comprising an inclined run way to receive the contents of an egg, a gate extending laterally of said run way to separate the yolk from the white of the egg, and means for conducting the separated parts into different receivers.

2. A device of the class described, comprising an inclined run way to receive the contents of an egg, a gate extending laterally of said run way constructed to obstruct the yolk of the egg but allow the white to flow past, means for receiving the white, means for emptying this white into a receptacle, and means for releasing the yolk and conducting it into a second receptacle.

3. A device of the class described, comprising an inclined run way to receive the contents of an egg, a gate extending laterally of said run way constructed to obstruct the yolk but to allow the white to flow past, a rocking platform constructed to receive the white of the egg and to be rocked by the weight of the same to discharge its contents, and means connecting this platform with the gate whereby the rocking of the former raises the latter and allows the yolk to pass into a receptacle.

4. A device of the class described, comprising an inclined run way to receive the contents of an egg, a gate extending laterally of said run way constructed to obstruct the passage in the run way of the yolk of the egg but to allow the white to flow past, a rocking platform constructed to receive the white of the egg and to be rotated by the weight of the same, a receiving vessel under said platform, means connecting this platform with the gate whereby the rotating of the former raises the latter and allows the yolk to pass into a yolk receptacle, said yolk receptacle being movably mounted so that the weight of the yolk causes it to swing downward to discharge its contents, and means connecting this vessel with a gate in the vessel whereby the swing of the yolk receptacle raises this gate and allows the white of the egg to pass out of the first vessel into a white receptacle.

5. A device of the class described, comprising an inclined run way to receive the contents of an egg, a gate extending laterally of said run way constructed to obstruct the passage in the run way of the yolk of the egg but to allow the white to flow past, a rocking platform constructed to receive the white of the egg and to be rotated by the weight of the same, a receiving vessel under said platform, a link connecting this platform with the gate whereby the rotating of the former raises the latter and allows the yolk to pass into a yolk receptacle, said yolk receptacle being so mounted that the weight of the yolk causes it to swing downward to discharge its contents, means for returning this yolk receptacle to its normal position after discharge, and a link connecting this receptacle with a gate in the vessel whereby swinging of the receptacle raises this gate and allows the white of the egg in the vessel to pass into a white receptacle.

6. A device of the class described, comprising an inclined run way to receive the contents of an egg, a rocking platform adjacent to the lower end of this run way to receive said contents from the run way and be rotated by the weight thereof, a receiving vessel under said platform, and an outlet in said vessel closed by the downward swing of the platform but normally open.

In testimony whereof I affix my signature in presence of two witnesses.

MARTIN BURRMEISTER.

Witnesses:
 HARTLEY W. BARTLETT,
 A. H. NEILSON.